Patented Nov. 22, 1927.

1,650,356

UNITED STATES PATENT OFFICE.

IVAN S. HOCKER, OF PHILADELPHIA, PENNSYLVANIA, ASSIGNOR TO THE HOCKER CORPORATION, OF PHILADELPHIA, PENNSYLVANIA, A CORPORATION OF DELAWARE.

PROCESS OF PREPARING FAT-FREE CHOCOLATE.

No Drawing. Application filed October 2, 1924. Serial No. 741,281.

My invention relates to a new and novel method of preparing a chocolate from the cacao bean or cocoa which will be practically free from any fat, chiefly cocoa butter, thereby rendering it available for a number of uses for which it has not been available heretofore due to the relatively large percentage of fat remaining in the chocolate after the process of extraction now commonly employed.

In carrying out my invention I may start with either the cacao bean of commerce, or any product thereof, such as cacao nibs, though for practical purposes I prefer to use the commercial cacao bean or cocoa powder, which commercial bean is the natural bean after it has been cured and roasted.

Preparatory to my process, I reduce the cacao bean to a paste of a fine state of division, by means of grinding, so that it may be acted upon more readily and uniformly by the several agencies of my process. This finely divided cocoa bean I mix with a considerable quantity of water, approximately one gallon of water to a pound of the ground cacao bean, and maintain the mixture in a suitable container at a temperature of 100° C. for a period of approximately thirty minutes. During this operation all the water soluble parts of the bean such as the sugars and albuminoids are brought into solution, while the insoluble starch is gelatinized by the action of the heat and water making it more easily decomposable during the subsequent steps of the process.

I next cool this mixture to about 65 degrees C. and add a suitable quantity of hydrolytic, or diastatic material, such as malt extract or syrup, of which a suitable proportion is:— one ounce of the malt extract to one gallon of the aqueous mixture. This mixture is then maintained at the approximate temperature of 65 degrees C. a sufficient length of time to completely hydrolize or saccharify the gelatinized starch to produce water soluble sugars chiefly maltose. During this period of 30 minutes more or less, depending upon the percentage of starch, which varies with the different varieties of cacao beans, there ensures a liberation of the fat. Thus the hydrolysis or saccharification of the starch leaves the fat dispersed throughout the mixture in a free condition.

The mixture is then allowed to stand a sufficient length of time to permit the liberated fat to coagulate and rise to the surface of the liquid. The fat thus collected on the surface is then skimmed off and the supernatant liquid is separated from the solid chocolate residue by decantation or filtration, or both.

The resulting product is a solid chocolate extract, free from fat, and also substantially free from starch.

In order to hasten the coagulation of the liberated fats, I may agitate the mixture slowly by means of any suitable stirring device.

It will now be apparent that I have devised a novel and useful process of preparing fat-free chocolate which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

The process of preparing fat-free chocolate which consists in heating an aqueous mixture of a cacao product sufficiently to gelatinize the starch constituents thereof, cooling the mixture, subjecting the mixture to hydrolysis sufficient to convert the starch constituents to sugars, allowing the mixture to stand a length of time sufficient to permit the dispersed fats to coagulate and rise to the surface of the mixture, separating the fat from the surface of the mixture, and separating the supernatant liquid from the fat free chocolate residue.

IVAN S. HOCKER.